3,299,049
3,17-BISOXYGENATED SPIRO-2-OXIRANYL-
5α-ANDROSTANES
Paul D. Klimstra, Northbrook, Ill., assignor to G. D.
Searle & Co., Chicago, Ill., a corporation of Delaware
No Drawing. Filed Apr. 1, 1965, Ser. No. 444,802
17 Claims. (Cl. 260—239.55)

The present invention is concerned with steroidal derivatives characterized by a spiro-oxirane ring substituent adjacent to an oxygenated function and especially to 3,17-bisoxygenated spiro-2-oxiranyl-5α-androstanes of the following structural representation

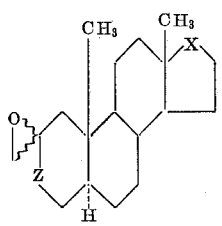

wherein X can be a carbonyl, β-hydroxymethylene, β-(lower alkanoyl) oxymethylene, or α-(lower alkyl)-β-hydroxymethylene radical, Z is a carbonyl, β-hydroxymethylene or β-(lower alkanoyl)oxymethylene group, and the wavy lines denote the optional α or β stereochemical configuration of the oxygen atom in the oxirane ring.

The lower alkyl radicals encompassed in the foregoing representation are those illustrated by the formula

$C_nH_{2n+1}$ wherein $n$ is a positive integer less than 8, and are typified by methyl, ethyl, isopropyl, tertiary-butyl, hexyl, and heptyl.

The term "lower alkanoyl" refers to radicals of the formula

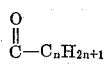

wherein $n$ is a positive integer less than 7. Specific examples are formyl, acetyl, butyryl, caproyl, etc.

The compounds which comprise the present invention are conveniently produced by epoxidation of the corresponding 2-methylene starting materials. Epoxidizing agents such as hydrogen peroxide, peracetic acid, perbenzoic acid, m-chloroperbenzoic acid, and monoperphthalic acid are particularly suitable. The process is preferably conducted at or below room temperature, the range of 0–30° being especially preferred. A specific example is the reaction of 2-methylene-5α-androstane-3β,17β-diol with m-chloroperbenzoic acid in a solvent system consisting of chloroform and benzene to afford spiro-2β-oxiranyl-5α-androstane-3β,17β-diol. 2-methylene - 5α - androstane-3β,17β-diol 3,17-diacetate, on the other hand, yields spiro-2α-oxiranyl-5α-androstane-3β,17β-diol 3,17-diacetate when submitted to the present process.

The spiro-oxiranyl compounds of this invention are designated as having either the 2α or 2β stereochemical configuration depending upon the position of the oxygen atom with respect to the plane of the steroid ring. When the oxygenated substituent of the starting material is a 3β-hydroxy group, the oxirane ring oxygen assumes a position on the same side of the steroid ring as the 3-substituent, thus is designated as 2β. When the 3-oxygenated substituent of the starting material, however, is a 3β-(lower alkanoyl)oxy group, the oxirane ring oxygen assumes a position on the opposite side of the steroid ring as the 3-substituent, thus is designated as 2α.

The instant compounds containing a carbonyl function at either or both the 3- and 17-positions are readily produced by oxidation of the corresponding hydroxy derivatives. As a specific illustration, 17α-methylspiro-2α-oxiranyl-5α-androstane-3β,17β-diol is contacted with chromium trioxide in pyridine to produce 17β-hydroxy-17α-methylspiro - 2α - oxiranyl-5α-androstan - 3 - one. Aqueous chromic acid is equally suitable as illustrated by use of that reagent to convert the instant 17α-methylspiro-2β-oxiranyl-5α-androstane-3β,17β-diol to 17β-hydroxy-17α-methylspiro-2β-oxiranyl-5α-androstane-3-one.

The instant hydroxy and lower alkanoyloxy compounds are readily interconvertible. Acylation of the hydroxy derivatives with an alkanoic acid anhydride or halide, preferably in the presence of a suitable acid acceptor, affords the corresponding lower alkanoyloxy compounds, while hydrolysis of those esters results in the corresponding hydroxy substances. Typical illustrations are the acylation of spiro-2β-oxiranyl-5α-androstane-3β,17β-diol by means of acetic anhydride in pyridine to yield the corresponding 3,17-diacetate and the hydrolysis of 17α-methylspiro-2α-oxiranyl-5α-androstane-3β,17β-diol 3-acetate by means of potassium carbonate in aqueous methanol to produce 17α-methylspiro-2α-oxiranyl-5α-androstane-3β,17β-diol.

The compounds of the present invention are useful as a result of their valuable pharmacological properties. In particular, they possess hormonal and anti-hormonal properties as is demonstrated by their anabolic, androgenic, and anti-estrogenic activity.

The invention will appear more fully from the examples which follow. These examples are set forth by way of illustration only and it will be understood that the invention is not to be construed as limited either in spirit or in scope by the details contained therein as many modifications in materials and methods will be apparent from this disclosure to those skilled in the art. In these examples, temperatures are given in degrees centigrade (°C.). Quantities of materials are expressed in parts by weight unless otherwise noted.

Example 1

A mixture of 2 parts of 2-methylene-5α-androstane-3β,17β-diol 3,17-diacetate, 78 parts of methanol, 20 parts of water and one part of potassium hydroxide is heated on the steam bath for about one hour, then is diluted with water to the first point of turbidity and allowed to cool to room temperature. The product which crystallizes from the mixture is collected by filtration and washed on the filter with water to afford crude 2-methylene-5α-androstane-3β,17β-diol, melting at about 173–176°. Recrystallization from methanol affords needle-like crystals of the pure substance, melting at about 179–182°.

Example 2

A solution of 2.3 parts of 2-methylene-5α-androstane-3β,17β-diol and 1.6 parts of m-chloroperbenzoic acid in 113 parts of chloroform containing 110 parts of benzene is allowed to stand at room temperature for about 16 hours, then is washed several times successively with saturated aqueous sodium carbonate and water. The organic layer is separated, dried over anhydrous sodium sulfate, and stripped of solvent under reduced pressure to afford the crude solid product. Recrystallization of that material from aqueous methanol affords pure spiro-2β-oxiranyl-5α-androstane-3β,17β-diol, melting at about 188–191° and displaying an optical rotation of 0.0° in chloroform. This compound can be represented by the following structural formula

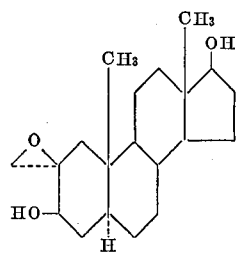

Example 3

To a solution of 5 parts of spiro-2β-oxiranyl-5α-androstane-3β,17β-diol in 120 parts of acetone is added dropwise an aqueous solution, 8 N in chromium trioxide and 8 N in sulfuric acid, until a slight excess of the reagent is present as evidenced by the persistence of its characteristic orange color. The excess reagent is destroyed by the addition of a small quantity of isopropyl alcohol, and the resulting mixture is filtered through diatomaceous earth. The filtrate is diluted with water, then cooled to 0–5°, and the resulting precipitate is collected by filtration, washed on the filter with water and dried in air. Crystallization of the resulting crude product from aqueous acetone affords pure spiro-2β-oxiranyl-5α-androstane-3,17-dione, melting at about 157–158.5°. This compound exhibits ultraviolet absorption maxima in chloroform at about 3.40, 5.75, and 5.83 microns.

Example 4

A mixture of 5 parts of spiro-2β-oxiranyl-5α-androstane-3β,17β-diol, 100 parts of pyridine and 50 parts of acetic anhydride is kept at room temperature for about 16 hours, then is poured carefully into water. The resulting aqueous mixture is cooled, and the precipitate is collected by filtration, washed on the filter with water, and dried in air to produce the crude product. Recrystallization from aqueous methanol affords white needle-like crystals of spiro-2β-oxiranyl-5α-androstane-3β,17β-diol 3,17-diacetate, melting at about 139–142°. Infrared absorption maxima are observed, in chloroform, at about 3.40, 5.78, and 7.94 microns. This compound is further characterized by the following structural formula

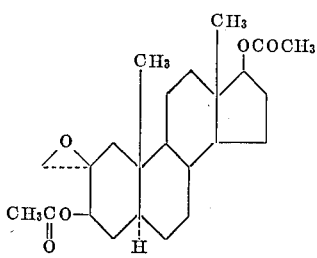

Example 5

To a solution of 5 parts of 17α-methyl-2-methylene-5α-androstane-3β-17β-diol in 450 parts of chloroform is added 300 parts by volume of 1 N perbenzoic acid in benzene. The resulting solution is kept at about 5° for about 16 hours, then is washed successively with saturated aqueous sodium carbonate and water. Drying over anhydrous sodium sulfate followed by removal of the solvent by distillation under reduced pressure affords the solid crude product. Recrystallization from aqueous acetone results in 17α-methylspiro-2β-oxiranyl-5α-androstane-3β,17β-diol, melting at about 182–184°. This compound can be represented by the following structural formula

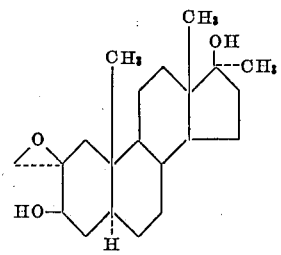

Example 6

To a solution of 2 parts of 17α-methylspiro-2β-oxiranyl-5α-androstane-3β,17β-diol in 40 parts of acetone is added dropwise an aqueous solution, 8 N in chromium trioxide and 8 N in sulfuric acid, until an excess of the reagent is present. A small quantity of isopropyl alcohol is then added to destroy the excess reagent, and the mixture is filtered through diatomaceous earth. The filter cake is washed with acetone, and the filtrate is diluted with water, then cooled at 0–5° in order to promote crystallization. The resulting crude product is collected by filtration, washed on the filter with water, and dried in air. Recrystallization from aqueous acetone produces 17β - hydroxy-17α - methylspiro - 2β-oxiranyl-5α-androstane-3-one, melting at about 194–197°. Infrared absorption maxima are observed, in chloroform, at about 2.75, 3.40, and 5.83 microns. This compound is represented by the following structural formula

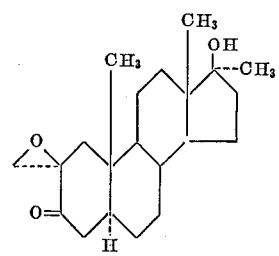

Example 7

A mixture of one part of 17α-methylspiro-2β-oxiranyl-5α-androstane-3β,17β-diol, 20 parts of pyridine, and 10 parts of acetic anhydride is kept at room temperature for about 16 hours, then is poured carefully into water, and the resulting aqueous mixture is cooled at 0–5° to effect crystallization. The resulting crystalline product is collected by filtration, washed on the filter with water, and dried in air. Further purification by recrystallization from aqueous methanol results in 17α-methylspiro-2β-oxiranyl-5α-androstane-3β,17β-diol 3-acetate, melting at about 122–125°. This compound is characterized further by infrared absorption maxima, in chloroform, at about 2.75, 3.40, 5.78, and 7.92 microns and also by the following structural formula

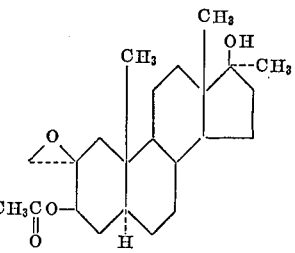

Example 8

To a solution of 1.8 parts of 2-methylene-5α-androstane-3β,17β-diol 3,17-diacetate in 22 parts of benzene is added successively 25 parts by volume of 1 N perbenzoic acid in benzene and 0.8 part of m-chloroperbenzoic acid. The resulting reaction mixture is kept at room temperature for about 16 hours, then is washed successively with saturated aqueous sodium carbonate and water. The washed organic solution is dried over anhydrous sodium sulfate containing decolorizing carbon, then is stripped of solvent by distillation under reduced pressure. The initially oily residue solidifies upon standing, then is purified by recrystallization from aqueous methanol to produce spiro-2α-oxiranyl-5α-androstane-3β,17β-diol 3,17-diacetate, melting at about 137–140°. This compound displays an optical rotation, in chloroform, of —25.5° and is further characterized by the following structural formula

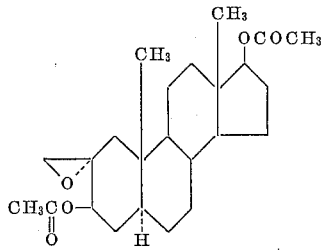

*Example 9*

To a warm solution of one part of 2α-oxiranyl-5α-androstane-3β,17β-diol 3,17-diacetate in 20 parts of methanol is added dropwise a solution of 0.7 part of potassium carbonate in 3 parts of water. The resulting reaction mixture is allowed to stand for approximately 50 minutes during which time the temperature falls to room temperature. Some needle-like crystals form during this period and further crystallization is promoted by the addition of water followed by cooling to 0–5°. The resulting crude product is collected by filtration, then washed on the filter with water and purified by recrystallization from aqueous methanol to yield spiro-2α-oxiranyl-5α-androstane-3β,17β-diol 17-acetate, melting at about 214–217°. This compound is characterized further by the following structural formula

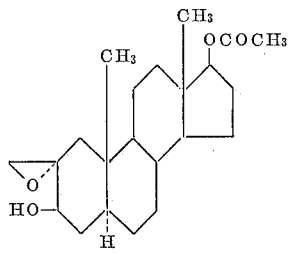

*Example 10*

To a solution of 2 parts of spiro-2α-oxiranyl-5α-androstane-3β,17β-diol 17-acetate in 120 parts of acetone is added dropwise an aqueous solution, 8 N in chromium trioxide and 8 N in sulfuric acid, until an excess is present. The excess reagent is then decomposed by the addition of a minimum quantity of isopropyl alcohol, and the resulting mixture is filtered through diatomaceous earth, then carefully diluted with water. The precipitate which forms upon cooling is collected by filtration, washed on the filter with water and dried in air. Recrystallization from aqueous acetone results in pure 17β-acetoxyspiro-2α-oxiranyl-5α-androstan-3-one, melting at about 165–167°. This compound can be represented by the following structural formula

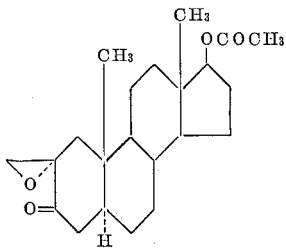

*Example 11*

To a solution of 5 parts of spiro-2α-oxiranyl-5α-androstane-3β,17β-diol 17-acetate in 200 parts of methanol is added a solution of 5 parts of potassium hydroxide in 30 parts of water. The resulting solution is heated at approximately 45° for about 10 minutes, then is diluted with water, and the precipitate which forms is collected by filtration, washed on the filter with water and dried in air. Recrystallization of the resulting crude product from aqueous methanol affords 2α-oxiranyl-5α-androstane-3β,17β-diol, melting at about 188–191°. This compound displays infrared absorption maxima, in chloroform, at about 2.75 and 3.40 microns and can be represented by the following structural formula

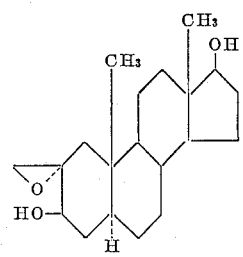

*Example 12*

A solution of 4 parts of 17α-methyl-2-methylene-5α-androstane-3β,17β-diol 3-acetate in 160 parts by volume of a benzene solution 0.7 N in perbenzoic acid is prepared and allowed to stand at about 5° for approximately 16 hours. That reaction mixture is then washed successively with saturated aqueous sodium carbonate and water, dried over anhydrous sodium sulfate containing decolorizing carbon, and distilled to dryness at reduced pressure. The residual yellow oil is recrystallized from aqueous methanol, thus producing 17α-methylspiro-2α-oxiranyl-5α-androstane-3β,17β-diol 3-acetate, melting at about 173–175°. This compound exhibits an optical rotation, in chloroform, of —35.5° and can be represented by the following structural formula

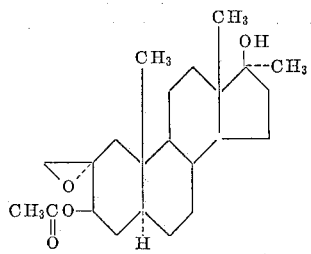

*Example 13*

To a warm solution of 1.9 parts of 17α-methylspiro-2α-oxiranyl-5α-androstane-3β,17β-diol 3-acetate in 32 parts of methanol is added dropwise a solution of one part of potassium carbonate in 5 parts of water. The reaction mixture becomes turbid and is allowed to stand until precipitation is complete. Filtration of that mixture removes the precipitated inorganic salts and the filtrate is diluted with water, then cooled to 0–5°. The resulting crystalline product is collected by filtration, washed on the filter with water and dried in air. Recrystallization from acetone results in pure 17α-methylspiro-2α-oxiranyl-5α-androstane-3β,17β-diol, melting at about 203–204°. It possesses an optical rotation of —23° in chloroform and is characterized further by the following structural formula

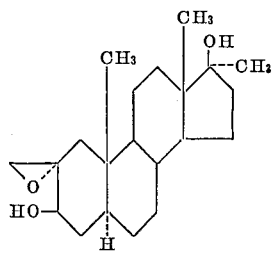

Example 14

A solution of 1.4 parts of chromium trioxide in 14 parts of pyridine is prepared with cooling and stirring. To the resulting solution is added over a period of about 5 minutes a solution of one part of 17α-methylspiro-2α-oxiranyl-5α-androstane-3β,17β-diol in 19 parts of pyridine. The resulting reaction mixture is stirred at room temperautre for about 16 hours, then is diluted with methylene chloride and washed with dilute aqueous sodium bicarbonate. The resulting emulsion is converted to a two-phase system by the addition of a small quantity of acetic acid. The organic layer is separated and again washed several times with dilute aqueous sodium bicarbonate until neutral. Drying of that solution over anhydrous sodium sulfate containing decolorizing carbon followed by distillation of the solvent under reduced pressure affords an oily crude product which is purified by recrystallization from acetone-hexane to yield pure 17β-hydroxy-17α-methylspiro-2α-oxiranyl-5α-androstan-3-one, melting at about 209–211°. It exhibits an optical rotation of −8° in chloroform and can be represented by the following structural formula

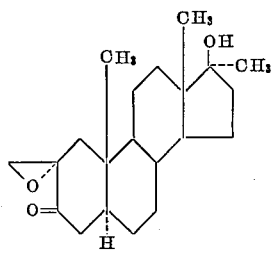

Example 15

The substitution of an equivalent quantity of propionic anhydride in the procedure of Example 4 results in spiro-2β-oxiranyl-5α-androstane-3β,17β-diol 3,17-dipropionate.

Example 16

By substituting an equivalent quantity of 17α-ethyl-2-methylene-5α-androstane-3β,17β-diol and otherwise proceeding according to the processes described in Example 5, there is obtained 17α-ethylspiro-2β-oxiranyl-5α-androstane-3β,17β-diol.

Example 17

By substituting an equivalent quantity of 17α-ethylspiro-2β-oxiranyl-5α-androstane-3β,17β-diol and otherwise proceeding according to the processes of Example 6, there is obtained 17α-ethyl-17β-hydroxyspiro-2β - oxiranyl - 5α-androstan-3-one.

Example 18

The substitution of equivalent quantities of 17α-ethylspiro-2β-oxiranyl-5α-androstane-3β,17β-diol and propionic anhydride in the procedure of Example 7 results in 17α-ethylspiro-2β-oxiranyl-5α-androstane-3β,17β - diol 3 - propionate.

Example 19

When an equivalent quantity of 2β-oxiranyl-5α-androstane-3β,17β-diol 3,17-dipropionate is hydrolyzed by the procedure of Example 9, there is obtained spiro-2β-oxiranyl-5α-androstane-3β,17β-diol 17-propionate.

Example 20

The substitution of an equivalent quantity of spiro-2β-oxiranyl-5α-androstane-3β,17β-diol 17-propionate in the procedure of Example 10 results in 17β-propionoxy-spiro-2β-oxiranyl-5α-androstan-3-one.

What is claimed is:
1. A compound of the structural formula

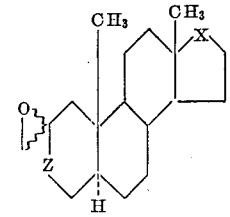

wherein X is selected from the group consisting of carbonyl, β-hIydroxymethylene, β-(lower alkanoyl)oxymethylene, and α-(lower alkyl)-β-hydroxymethylene radicals, and Z is a member of the class consisting of carbonyl, β-hydroxymethylene, and β-(lower alkanoyl)oxymethylene groups.

2. Spiro - 2β - oxiranyl - 5α - androstane - 3β,17β-diol.
3. Spiro - 2β - oxiranyl - 5α - androstane - 3,17-dione.
4. Spiro - 2α - oxiranyl - 5α -androstane - 3β,17β-diol 17-acetate.
5. A compound of the structural formula

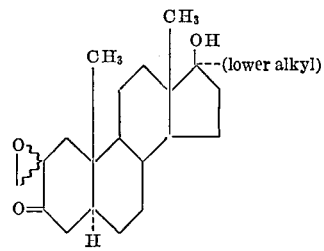

6. 17β - hydroxy - 17α - methylspiro - 2α - oxiranyl-5α-androstan-3-one.
7. 17β - hydroxy 17α - methylspiro - 2β - oxiranyl-5α-androstan-3-one.
8. A compound of the structural formula

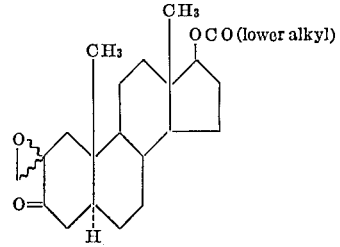

9. 17β - acetoxyspiro - 2α - oxiranyl - 5α - androstan-3-one.
10. A compound of the structural formula

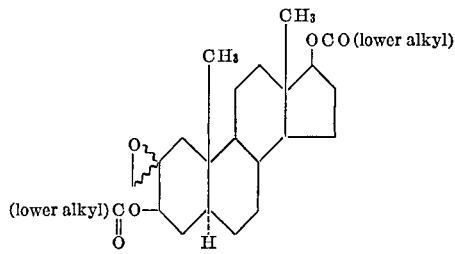

11. Spiro - 2α - oxiranyl - 5α - androstane - 3β,17β-diol-3,17-diacetate.

12. Spiro - 2β - oxiranyl - 5α - androstane - 3β,17β-diol-3,17-diacetate.

13. A compound of the structural formula

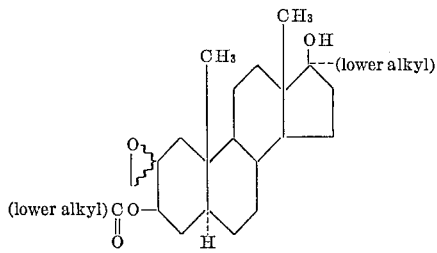

14. 17α - methylspiro - 2α - oxiranyl - 5α - androstane-3β,17β-diol 3-acetate.

15. A compound of the structural formula

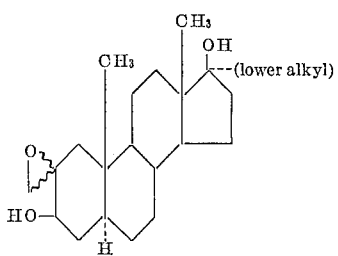

16. 17α - methylspiro - 2α - oxiranyl -5α - androstane-3β,17β-diol.

17. 17α - methylspiro - 2β - oxiranyl - 5α - androstane-3β,17β-diol.

No references cited.

LEWIS GOTTS, *Primary Examiner.*

H. FRENCH, *Assistant Examiner.*